United States Patent [19]

Miyazaki

[11] Patent Number: 4,624,429
[45] Date of Patent: Nov. 25, 1986

[54] HOSE FIXTURE
[75] Inventor: Takeshi Miyazaki, Inazawa, Japan
[73] Assignee: Toyoda Gosei Co., Ltd., Nishikasugai, Japan
[21] Appl. No.: 655,625
[22] Filed: Sep. 28, 1984
[30] Foreign Application Priority Data Sep. 29, 1983 [JP] Japan .................. 58-183920

[51] Int. Cl.$^4$ .................................. F16L 5/00
[52] U.S. Cl. ......................... 248/56; 248/27.1; 248/75; 403/197
[58] Field of Search ........... 248/56, 57, 27.1, 27.3, 248/75, 80; 285/189, 205, 256; 403/194, 197, 238, 239, 230; 174/65 R

[56] References Cited
U.S. PATENT DOCUMENTS

| 3,512,808 | 5/1970 | Graham | 285/189 |
| 3,594,025 | 7/1971 | Wagner | 285/189 |
| 4,407,042 | 10/1983 | Schramme et al. | 403/197 |
| 4,474,489 | 10/1984 | Simon | 248/56 |

Primary Examiner—Ramon O. Ramirez
Attorney, Agent, or Firm—Cushman, Darby & Cushman

[57] ABSTRACT

In order to permit a hose to be mounted to other structure using mounting fixtures of two different types, namely ones where the anti-rotation notches in the fixture opening are on a bulged part of the plate, and others where the plate is planar including where the anti-rotation notches are provided, the tubular member of the holder is provided with two axially adjoining flanges, with the anti-rotation lugs extending on both of these flanges. In use, the first flange abuts one face of the fixture and the second flange is surrounded by at least part of the periphery of the plate opening when either type of fixture is used. When the first type of fixture is used the lug portions on the first flange engage in the anti-rotation notches, but when the second type of fixture is used, the lug portions of the second flange engage in the anti-rotation notches. Therefore, only one type of hose holder needs to be stocked, regardless of which of the two types of mounting fixture is to be used.

3 Claims, 10 Drawing Figures

HOSE FIXTURE

BACKGROUND OF THE INVENTION (1) Field of the Invention

The present invention relates to a hose fixture which is mounted on an end or midway portion of a hose for mounting the hose in a mounting fixture having a mounting hole such as a hose midway holder or a hose joint.

(2) Description of the Prior Art

A hose fixture such as a hose midway holder of the above-specified type according to the prior art is shown in FIGS. 1 and 2 by way of example.

The hose midway holder 1 is mounted in a mounting fixture 8 which is formed with a rounded mounting hole 8a, rectangular notches 8b and 8b at both the sides of the mounting hole 8a, and bulging portions 8c and 8c at the outer sides of the notches 8b and 8b. The hose midway holder 1 is formed on its outer circumference with: a sleeve 6 which is to be caulked (i.e., squeeze-formed) when the holder 1 is fixedly mounted on a hose 7; a flange 2 which is to come into abutment against a face of the mounting fixture 8 bordering the circumferential edge of the mounting hole 8a when the holder 1 is mounted in the mounting fixture 8; a cylindrical inserted portion 3 which is to be inserted into the mounting hole 8; and a groove 4 into which is inserted a fixing clip 9 to be held between the circumferential edge of the mounting hole 8a and the flange 2. Moreover, the flange 2 is formed with flattened fitted faces 5 and 5 which are to be fitted on both the end faces of the bulging portions 8c and 8c of the mounting fixture 8 so that they can perform a turn-stopping function after the hose 7 has been mounted in the mounting fixture 8. Incidentally, the fixing clip 9 is formed with a U-shaped groove 9b while leaving two tongues 9a and 9a. These tongues 9a and 9a are curved and are sized to be inserted into the groove 4 of the hose midway holder 1 so that they prevent the hose midway holder 1 from coming out of the mounting fixture by holding the circumferential edge of the mounting hole 8a together with the flange 2 when they are inserted into the groove 4.

As a result, the hose midway holder 1 of the prior art has its flange 2 formed with the fitted faces 5 and 5 for performing the turn-stopping function, whereas the mounting fixture 8 is formed with the bulging portions 8c and 8c around the circumferential edge of the mounting hole 8a.

With the flange 2 formed with the fitted faces 5, however, it is necessary to form the mounting hole 8a around its circumferential edge with the bulging portions 8c and 8c which never fail to be fitted on the fitted faces 5 so that it takes an increased number of steps and a raised cost to manufacture the mounting fixture 8.

With this in mind, therefore, there has been proposed a mounting fixture 80, as shown in FIG. 3, which is freed from the increases in the step number and in the cost for its manufacture. Despite this fact, the mounting fixture 80 made of a flat plate formed with a rounded mounting hole 80a and rectangular notches 80b and 80b can be used with the hose midway holder 1 of the prior art.

SUMMARY OF THE INVENTION

It is an object of the present invention to provide a hose fixture which can be used not only with the mounting fixture of the prior art but also with a mounting fixture of the novel type shown in FIG. 3, having its manufacture step number and cost reduced.

Another object of the present invention is to make it unnecessary to prepare a hose fixture corresponding to the mounting fixtures of those respective types thereby to facilitate merchandise control of the hose fixtures.

The above-specified objects of the present invention can be achieved by a tubular hose fixture which is to be used when it is mounted on an end or midway portion of a hose for mounting the hose in a mounting fixture having a mounting hole and which comprises on its outer circumference: an inserted portion adapted to be inserted into the mounting hole; a flange formed at the end portion of the inserted portion and adapted to abut against the peripheral edge of the mounting hole; a groove formed in the inserted portion and adapted to receive a fixing clip to hold the peripheral edge of the mounting hole together with the flange; and fitted faces adapted to be fitted in the mounting hole for performing a turn stopping function, wherein the fitted faces corresponding to the mounting hole are formed to extend over the flange and the inserted portion.

DESCRIPTION OF THE PREFERRED EMBODIMENTS

Figure 1:
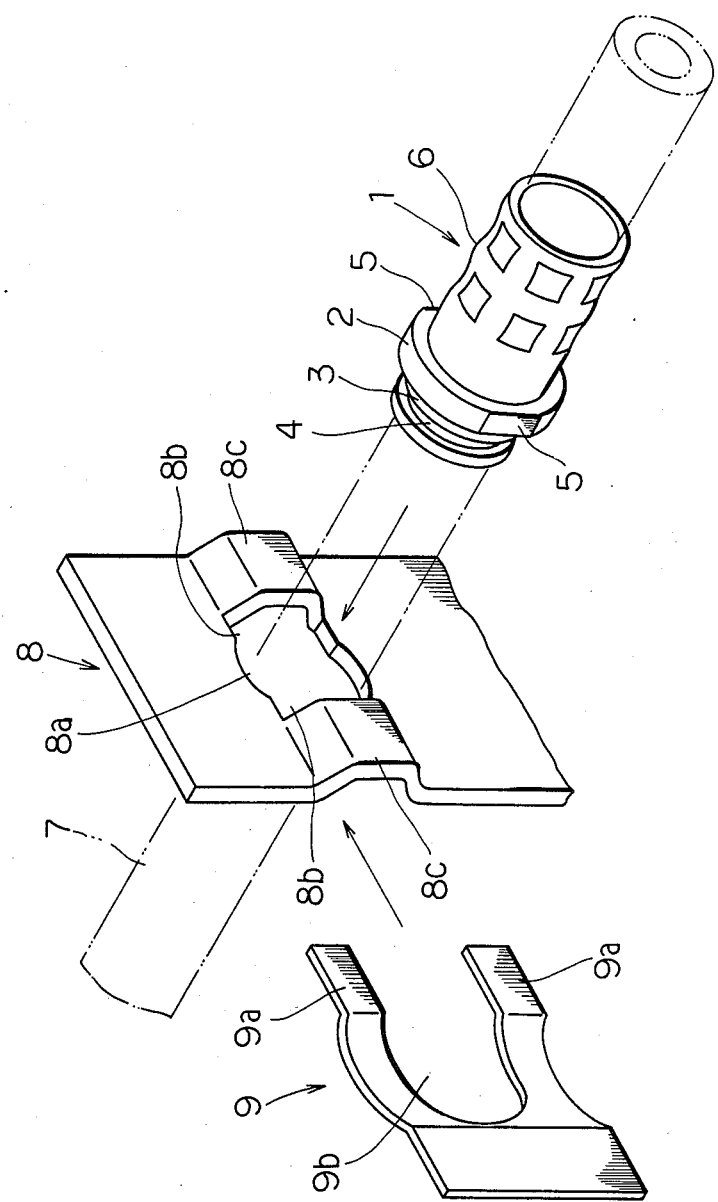
FIG. 1 is an exploded perspective view showing the using mode of a hose midway holder to be used with the mounting fixture of the prior art.
Figure 2:
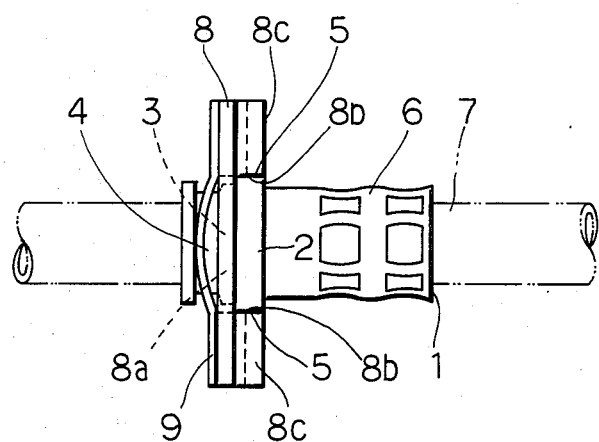
FIG. 2 is a top plan view showing the using mode of the hose midway holder to be used with the mounting fixture of the prior art.
Figure 3:
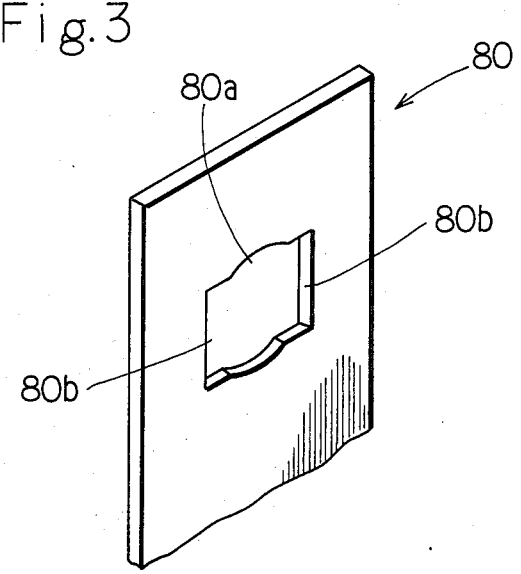
FIG. 3 is a perspective view showing a mounting fixture of novel type.
Figure 4:
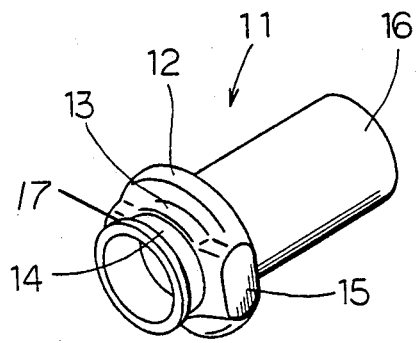
FIG. 4 is a perspective view showing a hose midway holder according to a first embodiment of the present invention.
Figure 5:
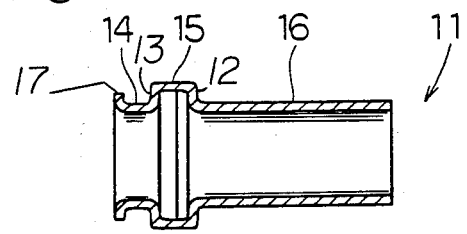
FIG. 5 is a longitudinal section showing the hose midway holder of the first embodiment of the present invention.

A hose midway holder 11 according to the first embodiment is made of a tubular member which has such an internal diameter that it can be mounted on a hose and which is made of a either metal such as steel, bronze or aluminum, or a nonmetallic material such as a synthetic resin or a synthetic resin reinforced by glass fibers or the like. The hose midway holder 11 is manufactured by cutting that tubular member a predetermined length, by subsequently bulging the cut member to plastically deform it thereby to form a first flange 12 which is to come into abutment against a face of the mounting fixture 8 or 80 bordering the circumferential edge of the mounting hole 8a or 80a of the mounting fixture 8 or 80, and by flaring the bulged member to plastically deform it thereby to form a groove 14, delimited by second and third flanges 13 and 17, for receiving the fixing clip 9. Moreover, the portion left unworked forms a sleeve 16 and the second flange, constituting an inserted portion 13 to be inserted into that mounting hole 8a or 80a. Simultaneously with the bulging step of the flange 12, there are formed flattened fitted faces 15 and 15 to be fitted in the notches 8b or 80b of the mounting hole 8a or 80a to extend over the flange 12 and the inserted portion 13.

Figure 6:
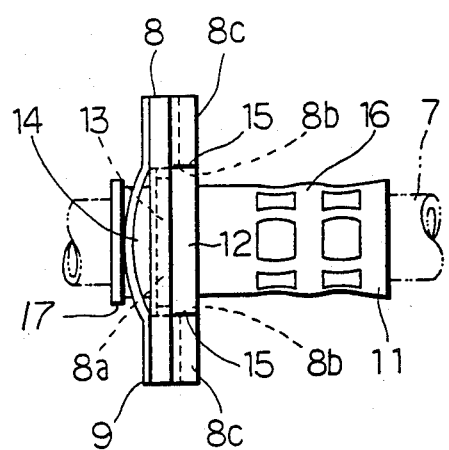
FIG. 6 is a top plan view showing the state in which the hose midway holder of the first embodiment of the present invention is mounted in the mounting fixture of the prior art.
Figure 7:
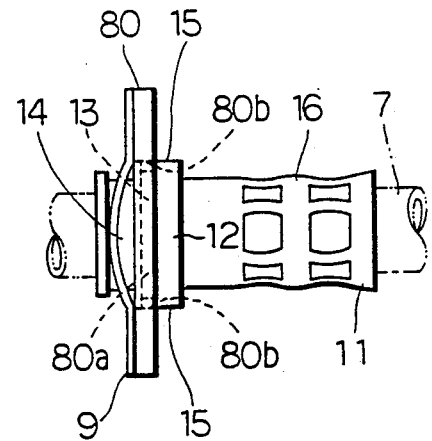
FIG. 7 is a top plan view showing the state in which the hose midway holder of the first embodiment of the present invention is mounted in the mounting fixture of novel type.

The using mode of the hose midway holder 11 thus manufactured will be described in the following. The hose midway holder 11 is mounted in position on the hose 7 and is fixed thereon either by caulking (i.e., squeeze forming) the sleeve 16 or by making use of an adhesive. The hose 7 thus fixed in the hose midway holder 11 is inserted into the mounting hole 8a or 80a of the mounting fixture 8 or 80 to bring the flange 12 into abutment against the circumferential edge of the mounting hole 8a or 80a (as shown in FIG. 6 or 7). At this time, the hose midway holder 11 inserted into the mounting fixture 8 of the prior art has its fitted faces 15 and 15 abutting at the side of the flange 12 against both the end faces of the bulging portions 8c and 8c, and the hose midway holder 11 inserted into the mounting fixture 80 of the novel type has its fitted faces 15 and 15 fitted at the side of the inserted portion 13 in the notches 80b and 80b, thus performing their respective turn-preventing functions against the mounting fixtures 8 and 80.

After that, if the fixing clip 9 is inserted into the groove 14, the circumferential edge of the mounting hole 8a or 80a is held between the flange 12 and the fixing clip 9 so that the hose 7 can be mounted in the mounting fixture 8 or 80 such it can neither come out of the mounting fixture 8 or 80 nor turn.

As has been described hereinbefore, the hose midway holder 11 of the first embodiment can be mounted not only in the mounting fixture 8 of the prior art but also the mounting fixture 80 of the novel type. Since the hose midway holder 11 is formed with its respective portions by plastically deforming the tubular member, moreover, its working period can be sufficiently short with a high yield and with a reduced weight so that its manufacture cost can be dropped. At the same time, the flow of the material is established in accordance with the shape of the hose midway holder so that the strength of the holder can be improved.

Figure 8:
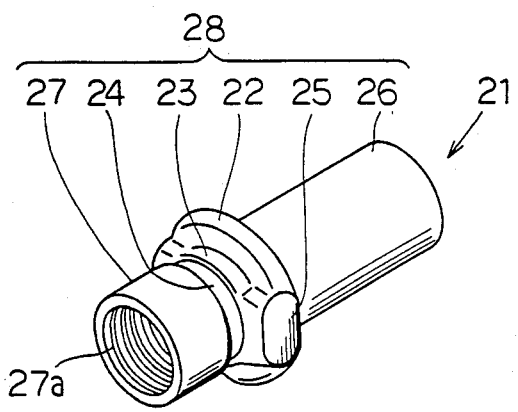
FIG. 8 is a perspective view showing a hose joint according to a second embodiment of the present invention.
Figure 9:
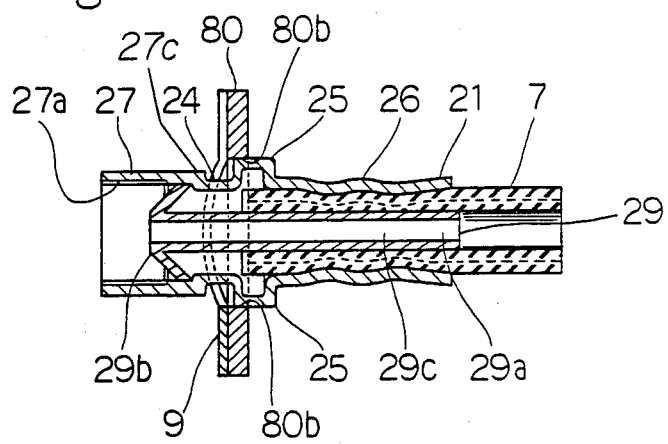
FIG. 9 is a longitudinal section showing the using mode of the hose joint of the second embodiment of the present invention.
Figure 10:
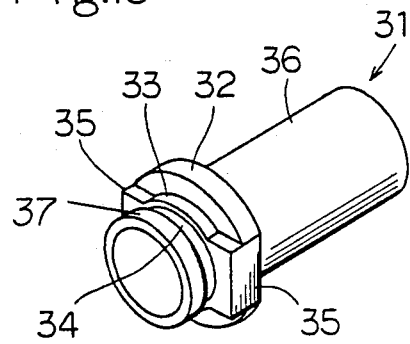
FIG. 10 is a perspective view showing a hose midway holder according to a third embodiment of the present invention.

FIGS. 8 and 9 show, as the second embodiment of the hose fixture, a hose joint 21 which is mounted on an end portion of the hose 7 when used, as is different from the hose midway holder 11 of the first embodiment.

The hose joint 21 of the second embodiment is constructed of two members, i.e., an outer sleeve 28 which can be mounted on the hose 7, and an inner sleeve 29 which is arranged in the outer sleeve 28 and can be mounted in the hose 7. Each of the outer sleeve 28 and the inner sleeve 29 is made of a tubular member which is similar to that of the first embodiment.

The outer sleeve 28 is manufactured by bulging the tubular member to plastically deform it thereby to form a first flange 22 which is to come into abutment against the circumferential edge of the mounting hole 80a of the mounting fixture 80, by rolling the bulged member to plastically deform it thereby to form a groove 24, delimited by second and third flanges 23 and 27c for receiving the fixing clip 9, and by internally threading, as at 27a, the inner circumference of the leading end of the groove 24 thereby to form a threaded portion 27. Moreover, the portion left unworked leaves a sleeve 26 and the second flange, constituting an inserted portion 23 to be inserted into the mounting hole 80a. Simultaneously with the bulging step, are formed flattened fitted faces 25 and 25 to be fitted in the notches 80b and 80b of the mounting hole 80 to extend over the flange 22 and the inserted portion 23.

The inner sleeve 29 is manufactured by flaring one end of the tubular member to form a sealing portion 29b which is to come into abutment against a mating member to be jointed thereto through the threaded portion 27 so that it performs a sealing action. The inner sleeve 29 is formed at the other end of the sealing member 29b with a nipple 29a, which is positioned in the sleeve 26 of the outer sleeve 28, and between the sealing portion 29b and the nipple 29a with a conduit 29c. And, this conduit 29c is arranged in a predetermined position in the outer sleeve 28 by a soldering or welding operation, press-fitted to the predetermined position or arranged in the predetermined position by a caulking (i.e., squeeze forming) operation.

In the using mode of that hose joint 21, the hose 7 is mounted on the nipple 29a of the inner sleeve 28, and the sleeve 26 of the outer sleeve 29 is caulked (i.e., squeeze formed) to fasten the hose 7 to the hose joint 21. The subsequent operations of mounting the hose joint 21 in the mounting fixture 80 are similar to those of the first embodiment. Since the fitted faces 25 and 25 are formed to extend over the flange 22 and the inserted portion 23, it is quite natural that the hose joint 21 can also be mounted in the mounting fixture 8 of the prior art.

Incidentally, the hose midway holder 11 and the hose joint 21 of the first and second embodiments are exemplified in a manner that they are formed with their respective portions by plastically deforming the respective tubular members. Despite this fact, however, if the fitted faces are formed to be fitted in the notches 8b or 80b of the mounting hole 8a or 80a, it is naturally possible to manufacture a tubular hose midway holder 31 which has its respective portions, for example, a sleeve 36, a first flange 32, fitted faces 35, a second flange constituting an inserted portion 33, a groove 34, delimited between second and third flanges 33 and 37 and so on formed by cutting one rod. On the other hand, another hose joint may be formed with its respective portions by cold-forging or cutting one rod.

In the shown embodiments, moreover, the mounting fixture 8 or 80 has its mounting hole shaped such that the rectangular notches are partially overlapped with the rounded hole. It is, however, quite natural that the hole should not be limited to those of the shown embodiments if it is shaped to perform an action to stop turns of the hose fixture such as the hose midway holder or the hose joint. In this modification, the fitted faces to be formed on the hose joint may have their shapes corresponding to the shape of the mounting hole.

What is claimed is:

1. A hose holder which is improved so as to be able to be alternatively used with either of the two different types of mounting fixture, namely (a) a first type of mounting fixture which includes a plate having an opening provided therethrough, this opening having a generally rounded bounding peripheral surface provided with two substantially angularly spaced, angularly short segments of substantially different radial extent than that of the remainder of said generally rounded peripheral surface, this plate being generally planar, but being bulged in one direction about an axis which extends generally parallel to a face of the plate in such a manner that both of said two substantially angularly spaced, angularly short segments of said peripheral surface of said opening are substantially axially displaced from the plane of the remainder of said plate, and (b) a second type of mounting fixture, which is like the first, but for omission of said bulge, so that said plate is substantially planar with both of said two substantially angularly spaced, angularly short segments of said peripheral surface of said opening and the remainder of said peripheral surface of said opening are disposed in common plane, said hose holder comprising:

a tubular member adapted to be mounted to a hose in surrounding relation to an axially short region of the hose, in order to permit the hose, at that region, to be mounted to another structure;

a first radially outwardly projecting flange fixed on said tubular member;

a second radially outwardly projecting flange fixed on said tubular member axially adjacent said first flange; and a third radially outwardly projecting flange fixed on said tubular member with axial spacing from said second flange so as to define between said second and third flanges a radially outwardly opening groove adapted to receive a spring clip;

said first and second radially outwardly projecting flanges both being defined in part by respective generally rounded radially outer peripheral surfaces, but each of these two radially outer peripheral surfaces including in common at two substantially angularly spaced sites respective angularly short segments of substantially different radial extent than that of the remainder of the respective two outer peripheral surfaces;

said first and second flanges, including said two angularly short segments thereof being sized and shaped to alternatively coact with said first and second mounting fixtures, as follows:

if the tubular member is inserted third flange first into a said opening of a said first type of mounting fixture, angularly aligned and axially advanced until portions of the first flange abut a respective one face of said first type of mounting fixture marginally of said opening, (a) portions of said second flange within the plane of said remainder of said plate of said first type of mounting fixture are radially closely surrounded by respective portions of said peripheral surface of said opening;

(b) said two angularly short segments of said first flange are radially closely surrounded by respective of said two angularly short segments of said peripheral surface of said opening in said bulge so as to prevent angular rotation of said hose holder relative to said first type mounting fixture; and (c) said radially outwardly opening groove is positioned to receive a spring clip to act between said third flange and the respective opposite face of said plate of said first type of mounting fixture for preventing substantial relative axial movement between said hose holder and said first type of mounting fixture, but if the tubular member is inserted third flange first into a said opening of a said second type of mounting fixture, angularly aligned and axially advanced until portions of the first flange about a respective one face of said second type of mounting fixture marginally of said opening:

(a) said second flange, including said angularly short segments thereof, is radially closely surrounded by said peripheral surface of said opening, including said angularly short segment thereof so as to prevent angular rotation of said hose holder relative to said second type of mounting fixture; and (b) said radially outwardly opening groove is positioned to receive a spring clip to act between said third flange and the respective opposite face of said plate of said second type of mounting fixture for preventing substantial relative axial movement between said hose holder and said second type of mounting fixture.

2. The hose holder of claim 1, wherein:
said first, second and third flanges are integrally provided on said tubular member.

3. The hose holder of claim 2, wherein:
said first, second and third flanges exist as radial enlargements of said tubular member.

* * * * *